April 30, 1957
H. D. SHRYACK
2,790,380
BARBECUE OVEN
Filed May 20, 1955
2 Sheets-Sheet 1
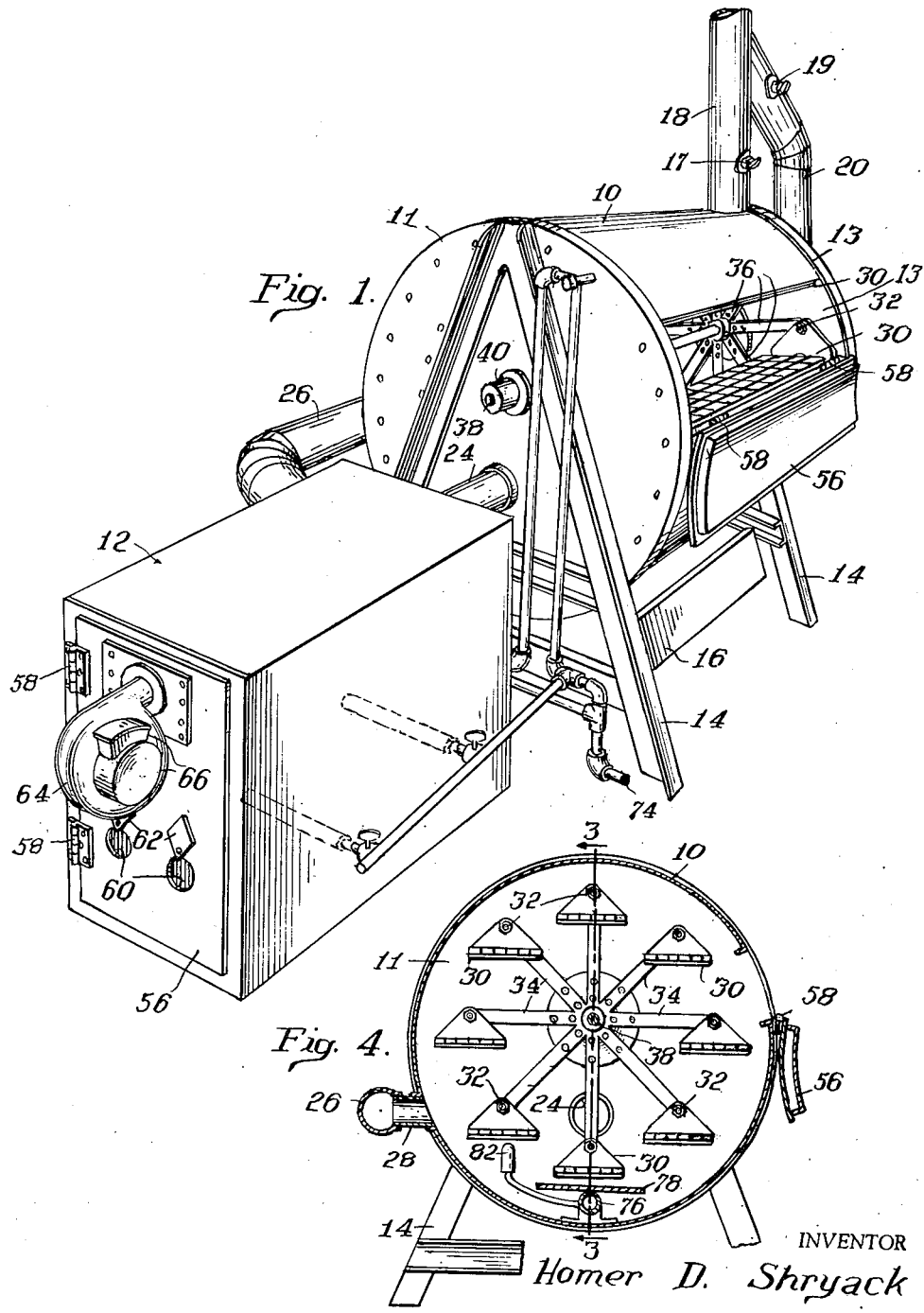
INVENTOR
Homer D. Shryack
BY Fisher & Christen
ATTORNEYS

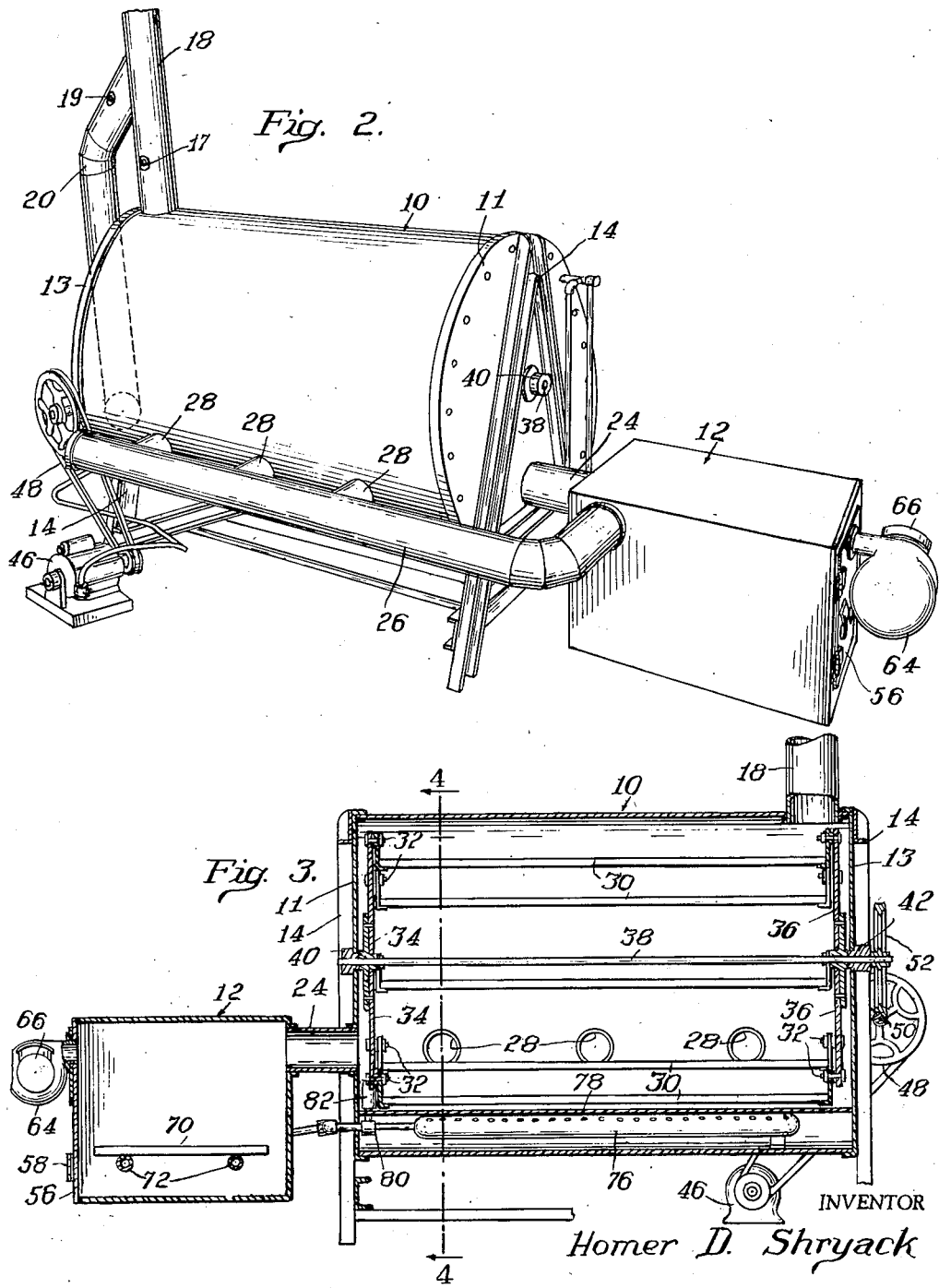

United States Patent Office

2,790,380
Patented Apr. 30, 1957

2,790,380

BARBECUE OVEN

Homer D. Shryack, Muskogee, Okla., assignor of forty-nine percent to William E. Hyde, Muskogee, Okla.

Application May 20, 1955, Serial No. 509,743

5 Claims. (Cl. 99—427)

This invention relates to a barbecue oven, and more particularly to a barbecue oven having an improved arrangement for producing and controlling smoke utilized in the barbecuing operation.

In barbecuing food, two important conditions must be met. The food must be prepared at the proper temperature, and the food must be exposed to the proper amount of smoke. The amount of smoke and the temperature are each subject to variation depending on the particular type of food being prepared.

Persons making prior art barbecuing ovens have not given proper attention to the criticality of the conditions referred to above. Accordingly, the barbecuing ovens of the prior art have been disadvantageous for a number of reasons. For example, in certain of the known ovens, smoke is generated inside the oven and the burning wood producing the smoke is supposed to serve as the heat producing means. Obviously the control of such an arrangement is extremely difficult, since the temperature and amount of smoke from burning logs are directly related so that it would be quite difficult to obtain a high heat along with a considerable volume of smoke.

Other devices, while providing separate heating and smoke-producing arrangements, do not provide proper controls whereby efficient and effective barbecuing operations can be performed on a wide variety of foods.

It is the object of the present invention to provide a barbecue oven which eliminates the disadvantages of the known ovens. This object is accomplished by providing a smoke box separate from the oven proper and suitable thermostat and smoke controlling arrangements for the attainment of the desired conditions of operation.

Another object of the invention is to provide a barbecue oven having a plurality of smoke outlets, mounted in different positions in the oven, and having individual dampers which are manually operable for controlling the amount of smoke.

It is still a further object of the invention to provide a burner in the interior of the oven proper for supplying heat for the barbecuing and cooking operation.

It is another object of the invention to provide a smoke box having air intake vents and a blower for forcing smoke from the box into the barbecuing oven.

These and other objects will become more readily apparent from a consideration of the following detailed description of the invention taken in conjunction with the accompanying drawings in which:

Fig. 1 is a perspective view of the oven as viewed from the side having the oven door;

Fig. 2 is a perspective view taken from the opposite side of the invention;

Fig. 3 is a sectional view taken along lines 3—3 of Fig. 4; and

Fig. 4 is a sectional view taken along lines 4—4 of Fig. 3.

The invention consists of a cylindrical barbecuing and smoking oven 10 which, in the preferred embodiment is constructed of sheet steel and an insulating means and is approximately six feet long and four feet in diameter. Located adjacent the oven is the smoke or fire box 12 made of thin sheet steel and having dimensions approximately 2 x 2 x 2½. It is to be understood that the dimensions referred to above may be varied for different types of operation without departing from the scope of the invention.

The oven 10 is mounted between two A frame members 14 which are connected together by struts 16 which serve to support the oven in the position elevated above the ground for convenience of operation.

One end of the oven has a first flue 18 extending out of the top of the cylinder 10 and a second flue 20 mounted on an oven end plate 13 at a location below the center of the oven. The oven is also provided with smoke inlet ducts 24 and 26 which convey smoke to the oven from the fire box 12. The duct 24 leads directly into the end of the oven remote from the outlet flues and the duct 26 is connected by three branch ducts 28 to the oven along the lower part of one side thereof.

As shown in Figs. 3 and 4, the inside of the oven is provided with a plurality of food trays 30 which are pivotally mounted at 32 between radial arms 34 and 36 rotatably mounted at either end of the oven respectively.

The arms 34 are splined to a shaft 38 which is journalled at 40 and 42 to the end plates 11 and 13, respectively.

The shaft 38 is caused to rotate, thus rotating the radial arms and the trays by an electric motor 46. The motor is connected by a belt and pulley arrangement 48 to the worm gear 50 which drives a worm wheel 52 splined to the shaft 38.

The firebox is provided with a door 56 hinged at 58 to the front of the fire box and having air intake vents 60.

The air intake vents have pivotally mounted plates 62 which may be swung around to close the vents completely or partially depending on the conditions of operation desired.

Also mounted to the door 56 is a blower 64 driven by an electric motor 66.

Inside the fire box are located burners 72 which serve additionally as supports for the hickory logs 70. The burning may be started immediately by the burners 72 which are connected to a gas inlet pipe 74.

The heat is provided in the oven by an elongated burner 76 which also is connected to the gas inlet pipe 74. This burner may be a single perforated pipe, a plurality of perforated pipes or any other comparable arrangement. The important fact is that the burner is located inside the oven proper, but its flame is shielded from the food by a baffle plate 78 located immediately above the burner.

The quantity of gas applied to the burner is regulated by a pilotstat valve 80 of known design controlled by a suitable thermostat arrangement 82 which can be set for any desired temperature.

In operation, the trays are loaded with the food which is to be barbecued and the thermostat set for the proper amount of heat. The motor 46 begins to cause the trays to rotate at approximately one revolution per minute. In the meantime, the fire of hickory logs or the like has been started in the fire box 12 and the blower 64 forces the smoke from the hickory logs into the oven 10.

The density of the smoke and the frequency of its change within the oven can be regulated by opening or closing the air intake vents 60 and by opening or closing the dampers 17 and 19 in the flues 18 and 20.

In a general manner, while there has been disclosed in the above description what is deemed to be the most practical and efficient embodiment of the invention, it should be well understood that the invention is not limited to such embodiment as there might be changes made in the arrangement, disposition and form of the parts without departing from the principle of the present invention as comprehended within the scope of the accompanying claims.

I claim:

1. A barbecue oven comprising, a cylindrical housing having a horizontal axis and forming a barbecuing chamber, a frame rotatably mounted in said housing on a horizontal axis, a series of food trays pivotally mounted around the periphery of said frame, means for rotating said frame, a long pipe gas burner mounted and extending longitudinally along the bottom of said housing, a thermostatically controlled gas supply connected to said burner for supplying a barbecuing heat to housing, a wood smoke generator, ducts connecting said smoke generator to a plurality of inlet openings in the cylindrical surface of said housing, said inlets being located below the axis of rotation of said frame and above said burner, whereby rotation of said frame and trays causes a circular flow of heat and smoke guided by the cylindrical internal surface of said housing.

2. The combination of claim 1, further including exit flues connected to said oven at different levels, and manually settable dampers in each of said exit flues.

3. The combination of claim 1, further including a worm wheel operatively connected to the horizontal axis of said frame, a worm for driving said worm wheel and a motor for driving said worm.

4. An oven according to claim 1 in which said smoke generator comprises a fire box for burning wood, said box having a hinged door provided with air inlet apertures, and a motor driven blower for supplying air in controlled volume to said fire box, as determined by the speed of the blower.

5. An oven according to claim 1 in which said housing has a door extending longitudinally along the side thereof for permitting operation on the food to be barbecued.

References Cited in the file of this patent

UNITED STATES PATENTS

| | | |
|---|---|---|
| 662,318 | Simpson et al. | Nov. 20, 1900 |
| 1,399,362 | Miller | Dec. 6, 1921 |
| 2,165,057 | Kellner | July 4, 1939 |
| 2,304,578 | Leisenheimer | Dec. 8, 1942 |
| 2,560,677 | Wilson | July 17, 1951 |
| 2,576,925 | Dillon | Dec. 4, 1951 |